US008458058B2

(12) United States Patent
Kuchs et al.

(10) Patent No.: US 8,458,058 B2
(45) Date of Patent: Jun. 4, 2013

(54) SYSTEM AND METHOD FOR DETERMINING TAX LIABILITY IN RESPONSE TO A MOBILITY

(75) Inventors: Michael Kuchs, New York, NY (US); Terence Duffeler, Greensboro, NC (US); Deborah Thomas, West Sussex (GB); Ramana M. Murthy, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 334 days.

(21) Appl. No.: 12/642,242

(22) Filed: Dec. 18, 2009

(65) Prior Publication Data

US 2011/0153476 A1 Jun. 23, 2011

(51) Int. Cl.
*G07F 19/00* (2006.01)
*H04M 15/00* (2006.01)
*G06Q 20/00* (2012.01)
*G07B 17/00* (2006.01)
*G06F 17/22* (2006.01)
*G06Q 40/00* (2012.01)
*G06Q 10/00* (2012.01)

(52) U.S. Cl.
USPC .............. 705/34; 705/19; 705/30; 705/31; 705/36 T; 705/39; 705/322

(58) Field of Classification Search
USPC ................................. 705/31, 30, 39
See application file for complete search history.

(56) References Cited

U.S. PATENT DOCUMENTS

| 6,411,938 | B1 * | 6/2002 | Gates et al. ............ 705/30 |
| 7,769,647 | B1 * | 8/2010 | Char et al. ............ 705/31 |
| 2003/0101112 | A1 * | 5/2003 | Gallagher et al. ........ 705/31 |
| 2006/0161499 | A1 * | 7/2006 | Rich et al. ............ 705/39 |
| 2007/0136156 | A1 * | 6/2007 | Seeley et al. .......... 705/30 |
| 2009/0187500 | A1 * | 7/2009 | Wilson et al. .......... 705/31 |

OTHER PUBLICATIONS

Heffernan, Douglas J. "State Source Taxation of Deferred Compensation: Employers Should Monitor Changes." Mar. 13, 2008. Faegre & Benson LLP website. <http://www.faegre.com/5434>.*

* cited by examiner

*Primary Examiner* — Matthew Gart
*Assistant Examiner* — Reva R Danzig
(74) *Attorney, Agent, or Firm* — Snell & Wilmer L.L.P.

(57) ABSTRACT

A tax event system is configured to evaluate a taxable event that gives rise to tax liability in multiple jurisdictions. The system provides for real time determination of location information (e.g. work location, residence location, assignment location, and the like) for the calculation of tax liability. Such real time analysis allows for transactions to be settled and tax liability to be satisfied in time periods prescribed by various regulating authorities.

15 Claims, 3 Drawing Sheets

SYSTEM AND METHOD FOR DETERMINING TAX LIABILITY IN RESPONSE TO A MOBILITY

FIELD OF INVENTION

The present invention generally relates to tax liabilities, and more particularly, to determining tax liabilities related to proceeds from a deferred compensation award.

BACKGROUND OF THE INVENTION

Deferred compensation is generally known as compensation that is not immediately paid to an employee. Types of deferred compensation include, for example, stock option awards, restricted stock awards (e.g. restricted stock units), 401(k) distributions, retirement plan distributions, and the like. Generally, a company may incentivize an employee with stock options that are provided to the employee in lieu of immediate monetary compensation. Typically, these stock options may not be exercised or sold before a specific event occurs (e.g. a certain period of time passes, the stock price reaches a certain level, the employee achieves a particular goal or milestone, etc). To complicate matters further, employees often move locations before the deferred compensation is paid. As such, a tax liability may attach in multiple jurisdictions, thereby requiring an employer to determine taxes due to the respective jurisdiction(s) where the employee lived and/or worked; when the employee was originally awarded the deferred compensation; during the required vesting period; and/or when the employee ultimately received the proceeds from the award.

Further, regulatory agencies governing settlement of publicly traded assets of companies require that these transactions and the corresponding tax liabilities be settled in mandated periods of time. For example, the U.S. Securities and Exchange Commission requires that employers settle stock option transactions and determine applicable tax liability within three days of the stock option exercise. As such, there is a need to determine location information for a deferred compensation transaction in real-time so that the transaction is settled and the tax liability is determined within the mandated period of time. Further, there is a need to insure that tax liability is determined properly to avoid penalties, fines, and audits by taxing authorities.

SUMMARY OF THE INVENTION

Methods and systems provide employers with the ability to determine tax liabilities arising from deferred compensation awards. In general, a system is configured to receive information describing a transaction in response to a recipient receiving proceeds of a deferred compensation award. The information is then analyzed to determine whether the transaction gives rise to a taxable event. The information concerning the recipient is also evaluated to determine whether the transaction amounted to a mobility taxable event or a non-mobility taxable event. The system is also configured to determine the tax liability for each tax authority having jurisdiction over the transaction. The system may further be configured to satisfy the tax liability by transferring a portion of proceeds from the transaction to one or more tax authorities.

In an embodiment, the system is configured to acquire location information for a recipient to determine where the tax liability attaches for a particular transaction. The system is able to acquire the location information in real-time from various sources, including the system that processed the transaction and the system that monitors the recipient's location throughout the recipient's employment.

By evaluating location and transaction information in real-time, the system settles transactions within mandated periods of time established by various regulating authorities, such as the U.S. Securities and Exchange Commission. Further, the system satisfies tax liabilities in multiple jurisdictions, partially or fully insulating the employer from the risk of fines, penalties, and audits, where the transactions and tax liability are not properly settled.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION

Figure 1:
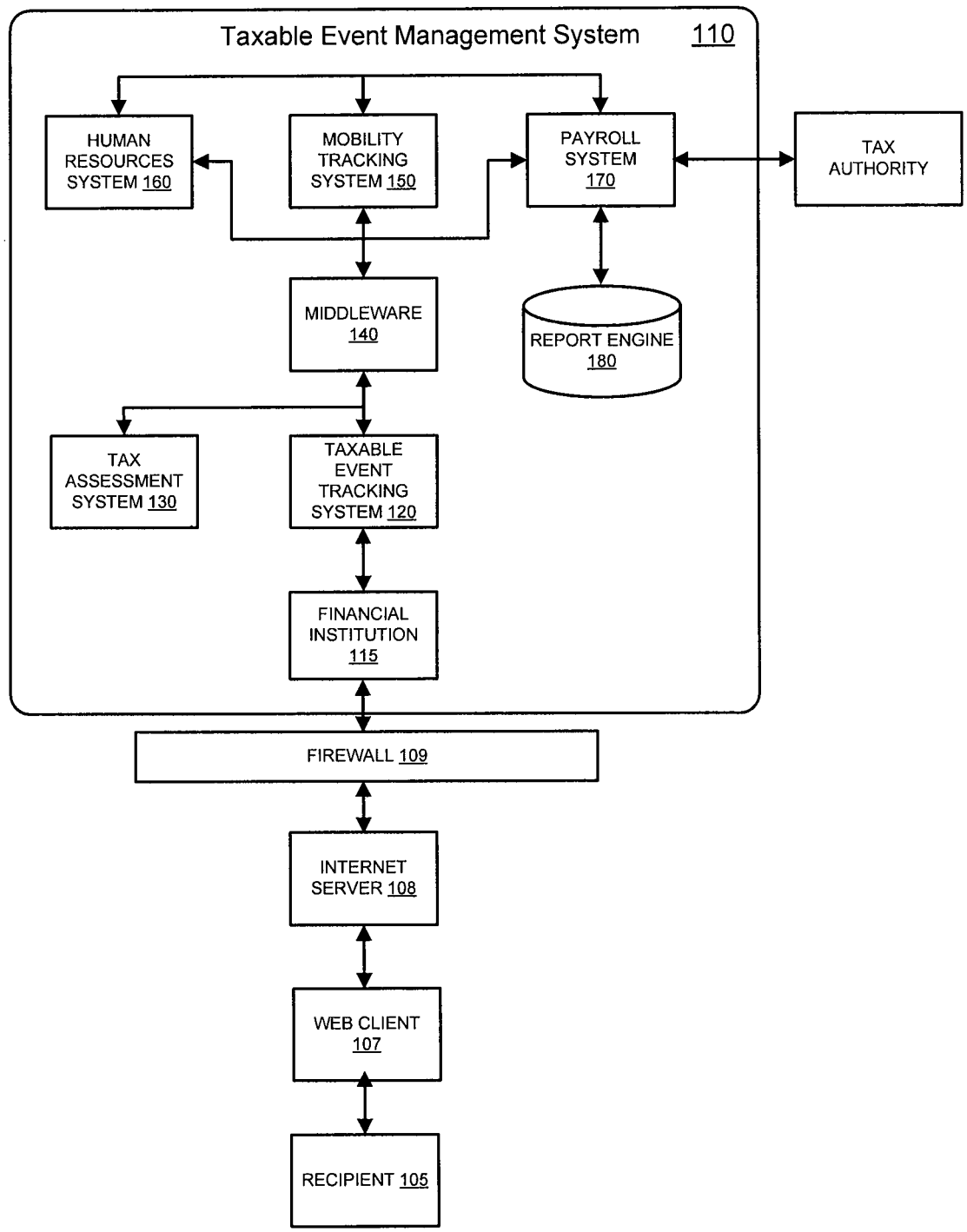
FIG. 1 is a block diagram illustrating major system components for processing deferred compensation award transactions, in accordance with an exemplary embodiment of the present invention.

The detailed description herein is presented for purposes of illustration only and not of limitation. For example, the steps recited in any of the method or process descriptions may be executed in any order and are not limited to the order presented. For the sake of brevity, conventional data networking, application development and other functional aspects of the systems (and components of the individual operating components of the systems) may not be described in detail herein.

"Recipient" may include any individual, employee, contractor, group, beneficiary, account holder, charitable organization, software, hardware, and/or other entity that has an interest in a deferred compensation award.

A "transaction account" may include any account and/or data field that may be used to facilitate a financial transaction.

A "financial institution" may include any entity that offers transaction account services to recipients. Although often referred to as a "financial institution," the financial institution may represent any type of bank, brokerage, lender or other type of account issuing institution. It is further noted that other participants may be involved in some phases of the transaction, such as an intermediary settlement institution.

The systems and methods include a unique combination of one or more features associated with the settlement of jurisdictional taxes assessed on deferred compensation awards by municipalities, counties, states, countries, and/or the like, and is conveniently described in that context. However, the invention has equal application to various other fees, taxes, penalties, and assessments imposed by authorized authorities in multiple jurisdictions.

In general, the systems and methods facilitate multi jurisdictional tax settlement resulting from a deferred compensation award. More specifically, a system and method is disclosed for determining tax liability for one or more taxable authorities, along with calculating and accounting taxes for taxable events resulting from the awarding, vesting, and/or realizing proceeds from the deferred compensation. Various types of deferred compensation may be analyzed by the system described herein. For example, the stock options are one such type of deferred compensation and thus, the following examples will often be described in this context.

In the context of deferred compensation, a taxable event occurs in response to the recipient receiving proceeds from a deferred compensation award. Receiving a deferred compensation award may include, for example, exercising stock options, vesting of restricted stock units, and/or receipt of monetary distributions from a 401(k) and/or retirement plan. In response to the taxable event occurring, tax liability is determined by evaluating the tax obligations of the recipient based on, for example, the location of the recipient at the time proceeds from the deferred compensation were received and at the time the deferred compensation was awarded. The location of the recipient may be determined by the recipient's home residence location, the recipient's workplace location, and/or recipient's work assignment location. Such location may also be determined based on data about the recipient from any source or database (e.g., human resource database, public records, private records, bank records, school records, transaction records, tax records, phone records, global positioning system information, and/or data transmission records (e.g., texting, Blackberry, etc))

With reference to FIG. 1, and in accordance with an embodiment, system 100 may be any system configured to track, manage, report, and/or reconcile deferred compensation awards and associated tax liability. In an exemplary embodiment, system 100 comprises a Tax Event Management System ("TEMS") 110 in electronic communication with a financial institution 115 and/or a recipient 105 of a deferred compensation award. TEMS 110 may be configured to analyze events associated with transactions that are initiated by recipient 105 via financial institution 115.

In an embodiment, a TEMS 110 is any software and/or hardware suitably configured to track and manage deferred compensation awards and/or associated tax liability. TEMS 110 may comprise a mobility tracking system, a taxable event tracking system, a human resources management system, a tax assessment system and/or the like. In an exemplary embodiment, the mobility tracking system may be in communication with the taxable event tracking system, the human resources management system, and/or the tax assessment system. An exemplary TEMS 110 may be configured to monitor transactions resulting from deferred compensation awards; analyze those transactions to identify taxable events; assess those transactions to determine the nature of the tax liability; and make necessary payments to satisfy the tax liability associated with the taxable event.

In accordance with an embodiment, TEMS 110 may be configured to analyze events associated with transactions that automatically vest in the recipient 105 at financial institution 115. TEMS 110 may comprise web client 107, Internet server 108, taxable event tracking system 120, tax assessment system 130, middle ware 140, mobility tracking system 150, human resources system 160, payroll system 170, report engine 180, and/or other systems. Other systems may include, for example, management information systems, business information systems, third-party data providers and the like. Each of the systems may be interconnected by a network via any method and/or device described herein.

Web client 107 comprises any hardware and/or software suitably configured to facilitate requesting, retrieving, updating, analyzing, entering and/or modifying data. In one embodiment, web client 107 is configured to facilitate input, receipt and/or review of information relating to transactions initiated by recipient 105 at financial institution 115. Web client 107 includes any device (e.g., personal computer) which communicates (in any manner discussed herein) with TEMS 110 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 107 may or may not be in direct contact with TEMS 110. For example, web client 107 may access the services of TEMS 110 through another server, which may have a direct or indirect connection to Internet server 108.

As those skilled in the art will appreciate, web client 107 includes an operating system (e.g., Windows NT, 95/98/2000, OS2, UNIX, Linux, Solaris, MacOS, etc.) as well as various conventional support software and drivers typically associated with computers. Web client 107 may include any suitable personal computer, network computer, workstation, minicomputer, mainframe or the like. Web client 107 can be in a home or business environment with access to a network. In an exemplary embodiment, access is through a network or the Internet through a commercially available web-browser software package.

Web client 107 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Web client 107 may include any number of applications, code modules, cookies, and the like to facilitate interaction with TEMS 110 in order to, for example, view statements, view transactions terms, view transaction information, submit/authorize a transactions, and the like. In one embodiment, web client 107 may store recipient 105 preferences and/or any other information disclosed herein on a hard drive or any other local memory device. Accordingly, web client 107 may retrieve and store recipient information within a memory structure of web client 107 in the form of a browser cookie, for example. In another embodiment, web client 107 retrieves information relating to recipient 105 from TEMS 110 on establishing a session with Internet server 108.

Firewall 109, as used herein, may comprise any hardware and/or software suitably configured to protect TEMS 110 components from users of other networks. Firewall 109 may reside in varying configurations including stateful inspection, proxy based and packet filtering among others. Firewall 109 may be integrated as software within Internet server 108, any other TEMS 110 components or may reside within another computing device or may take the form of a standalone hardware component.

Internet server 108 may include any hardware and/or software suitably configured to facilitate communications between web client 107 and one or more TEMS 110 components. Further, Internet server 108 may be configured to transmit data to web client 107 within markup language documents. As used herein, "data" may include encompassing information such as commands, queries, files, data for storage, and/or the like in digital or any other form. Internet server 108 may operate as a single entity in a single geographic location or as separate computing components located together or in separate geographic locations.

Internet server 108 may provide a suitable web site or other Internet-based graphical user interface which is accessible by recipients. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Middleware 140 may include any hardware and/or software suitably configured to facilitate communications and/or process transactions between disparate computing systems. A middleware server and/or application 140 may serve as an intermediary between the various systems to ensure appropriate communications between disparate platforms. Middleware components are commercially available and known in the art. Middleware 140 may be implemented through commercially available hardware and/or software, through custom hardware and/or software components, or through a combination thereof. Middleware 140 may reside in a variety of configurations and may exist as a standalone system or may be a software component residing on the Internet server 108. Middleware 140 may be configured to process transactions between the various components of TEMS 110 and any number of internal or external systems 100 for the purposes disclosed herein.

TEMS 110 or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, a computer and/or a computer program product. Accordingly, individual system 100 components may take the form of an entirely software embodiment, an entirely hardware embodiment, or an embodiment combining aspects of both software and hardware. In one embodiment, a system 100 component (e.g. a computer) may include a processor, a memory, a communications interface, a network interface, etc. Furthermore, individual system 100 components may take the form of a computer program product on a computer-readable storage medium having computer-readable program code means embodied in the storage medium. Any suitable computer-readable storage medium may be utilized, including hard disks, CD-ROM, flash memory, optical storage devices, magnetic storage devices, and/or the like. In one embodiment, a system 100 component and/or subsystem comprises a network interface communicating with a memory, the memory communicating with a processor; and the processor, when executing a computer program, configured to accomplish a variety of functions and/or steps.

The system discussed herein contemplates uses in association with web services, utility computing, pervasive and individualized computing, security and identity solutions, autonomic computing, commodity computing, mobility and wireless solutions, open source, biometrics, grid computing and/or mesh computing.

In accordance with an embodiment, and with continued reference to FIG. 1, taxable event tracking system 120 may be any hardware and/or software suitably configured to monitor transactions and/or identify taxable events in response to those transactions. For example, taxable event tracking system 120 may be configured to monitor an award of restricted stock to recipient 105 and identify the vesting date of the award. In response to a vesting of restricted stock, taxable event tracking system 120 may record, store, tag, and/or identify details describing the vesting event and the recipient and communicate that information. In an exemplary embodiment, taxable event tracking system 120 is configured to monitor a recipient initiated exercise of stock options. In response to a recipient action, taxable event tracking system 120 may record, store, tag, and/or identify information describing the stock options transaction and communicate that information.

In an exemplary embodiment, taxable event tracking system 120 is a stand alone system. Taxable event tracking system 120 may be configured to review any portion of or all transactions processed by a financial institution. Taxable event tracking system may be configured to categorize transactions in a variety of manners including, for example, categorizing transactions by recipient, categorizing transactions by type of asset, categorizing transactions by asset source, and/or the like.

In one embodiment, taxable event tracking system 120 may be configured as a component of a recipient transaction system. A recipient transaction system may be provided via web client 107 by financial institution 115, where the financial institution is responsible for administering various types of recipient initiated transactions. In an exemplary embodiment, a recipient transaction system may be configured to facilitate a transaction initiated by recipient 105. In various exemplary embodiments, a recipient transaction system may be accessible through a computer network, such as the Internet, through a phone system accessible by a recipient, through an agent, such as a customer service representative, available for in person transactions initiated by the recipient, and the like. As such, taxable event tracking system 120 may be configured to monitor recipient initiated actions (e.g., exercising stock options, vesting of restricted stock, receiving monetary distributions from a 401K or retirement plan, etc) through recipient transaction systems and report such recipient initiated actions to MTS 150 as first information.

In an exemplary embodiment, taxable event tracking system 120 may be configured to create second information such as, for example, an event log comprising the details of a subset of or all transactions processed by a particular financial institution. For example, taxable event tracking system 120 may be configured to review, analyze, and/or categorize each transaction, such that transactions may be reported in a variety of manners including, for example, a taxable transaction or a non-taxable transaction, recipient transactions, asset source transactions, asset type transactions, and the like.

In one embodiment, taxable event tracking system 120 may be configured to communicate an event log. Taxable event tracking system 120 may be configured to communicate a record of transactions to a recipient, to an asset source, to a regulatory agency, and/or similar interested party. These communications may be customizable such that the information reported to one party may only contain information relevant to the party, such that the privacy of the recipient is protected, while the reporting requirements for transactions are satisfied.

With continued reference to FIG. 1, and in accordance with an embodiment, taxable event tracking system 120 may be in electronic communication with mobility tracking system ("MTS") 150. This communication may be a communication through a computer network, such as the Internet, or through middleware 140, discussed above.

In one embodiment, MTS 150 may be any hardware and/or software suitably configured to analyze and characterize transactions. For example, MTS 150 may be configured to parse an event log (e.g., including first information and second information) communicated to MTS 150 by taxable event tracking system 120 to identify individual transactions for analysis. MTS 150 may be configured to obtain recipient information in response to identifying an individual transaction. MTS 150 may also be configured to analyze the individual transaction, referencing the recipient information to characterize transactions.

In an embodiment, MTS 150 may determine the recipient who initiated the transaction, such that the transaction is analyzed given the specific parameters associated with the recipient. These parameters may include, for example, location information for the recipient, tax liability information for the recipient, and the like. To analyze a particular transaction, MTS 150 analyzes the details of the transactions. In one embodiment, recipient 105 receives proceeds from stock options and MTS 150 determines location information for the recipient. For example, MTS 150 may be configured to determine location information for recipient 105 automatically and in real time by accessing a database such as human resources system 160, discussed below. In particular, MTS 150 determines location information for the recipient where tax liability attaches. For example, tax liability attaches at two times for a stock option transaction. In the context of stock options, recipient 105 is subject to: (1) a tax liability associated with the location of recipient 105 when the stock options were awarded; and (2) a tax liability associated with the location of recipient 105 when the stock options are exercised. Under current rules, this tax liability only attaches when the stock options are exercised and is a "look back" analysis. As such, tax liability may attach to recipient 105 in multiple jurisdictions, such that recipient 105 is subject to tax liability from multiple tax authorities, depending on the location information of the recipient when the stock options were awarded and exercised.

As used herein, the term "proceeds" shall include any award from a deferred compensation program. The award may include shares of stock vested in the recipient from a restricted stock award, a monetary award of the market value of exercised stock options, shares purchased through exercised stock options, monetary distributions from a 401(k) program, and/or monetary distribution form a retirement program.

As used herein the term "receiving proceeds" shall include identifying the recipient of stock, monetary awards, or monetary distributions from a deferred compensation program or providing the recipient with stock or monetary distributions from a deferred compensation program.

As used herein the term "location information" shall include the physical place of each of a recipient's work location, home location, and/or assignment location, and the associated tax jurisdiction(s) for each of the work location, home location, and/or assignment location.

With continued reference to FIG. 1 and in accordance with an embodiment, MTS 150 may be in electronic communication with a human resources system 160. Human resources system 160 may be any hardware and/or software suitably configured to receive, store, and/or transmit recipient information. Human resources system 160 may be configured to receive and store location information for recipient 105, including historical location information, time at a location, and current location information for a recipient. In an embodiment, human resources system 160 may be configured to receive an information request from, for example, MTS 150 and provide a real-time response. The request may comprise a request for location information at specific dates, for example, location information for a date corresponding to a stock option award and location information for a date corresponding to a stock option being exercised. In response to the request, human resource system 160 accesses a data file for recipient 105, parses recipient's location information, and analyzes recipient's current and historical location information. Thereafter, human resources system 160 provides a response to MTS 150 in real-time, containing at least the location information for the date of the deferred compensation award and location information for the date recipient received proceeds from the deferred compensation award.

In an embodiment, MTS 150 is configured to determine the duration of time a recipient is at a location. For example, recipient 105 may work at a first location, corresponding to a first tax authority, when recipient 105 is provided with a restricted stock award. Before the restricted stock award vests, recipient 105 may move his/her work to a second location, corresponding to a second tax authority. Upon vesting of the restricted stock award, recipient 105 may be subject to tax liability at the first location and the second location. As such, MTS 150 is configured to identify the first location, identify the associated first tax authority, and determine the duration of time recipient 105 was subject to the first tax authority (e.g. from the time of the restricted stock award was granted to recipient 105 until the time recipient 105 moved to the second location). MTS 150 is also configured to identify the second location, identify the associated second tax authority, and determine the duration of time recipient 105 was subject to the second tax authority (e.g. from the time recipient 105 moved to the second location until the time the restricted stock award vested). Further, MTS 150 may communicate this duration information for the first location and the second location to tax assessment system 130 such that tax liability may be determined based on the duration of time recipient 105 was subject to the first tax authority and the second tax authority.

In an embodiment, MTS 150 is configured to characterize the tax liability of recipient 105. MTS 150 analyzes location information and information associated with the transaction to characterize the transaction as a non-taxable event, a non-mobility taxable event, or a mobility taxable event. As used herein, a "non-mobility taxable event" includes a transaction that results in recipient 105 receiving proceeds, such that recipient 105 is subject to tax liability in a single jurisdiction (single municipality, county, state, country tax liability). As used herein, "mobility taxable event" includes a transaction that results in recipient 105 receiving proceeds, such that recipient 105 is subject to tax liability in multiple jurisdictions (multiple municipality, county, state, or country tax liabilities).

In one embodiment, MTS 150 compares, in real-time, the location information for the recipient at the time of the deferred compensation award and location information for the recipient at the time the recipient receives proceeds. Where the location information for each time is equal (or equivalent based on certain rules), MTS 150 determines that tax liability attaches in one jurisdiction and characterizes the transaction as a non-mobility taxable event. Where the location information for each time is not equal (or not equivalent based on certain rules), MTS 150 determines that the tax liability attaches in more than one jurisdiction and characterizes the transaction as a mobility taxable event. In response to the MTS 150 characterizing the transaction as a mobility taxable event, MTS 150 communicates the details of the transaction to tax assessment system 130.

With continued reference to FIG. 1, and in accordance with an embodiment, tax assessment system 130 may be any hardware and/or software suitably configured to analyze taxable events. Tax assessment system 130 may be configured to receive details of a transaction, including recipient location information, asset type, proceeds, and the like. Further, Tax assessment system 130 may be configured to analyze the data to determine tax liability based on the location information. In an embodiment, tax assessment system 130 is configured to determine multi jurisdictional tax liability in response to receiving information to a mobility taxable event from MTS 150. Tax assessment system 130 is configured to calculate tax liability for a transaction, such as, the exercise of stock options, where a recipient is subject to a first tax liability associated with location information when the stock options were awarded and a second tax liability associated with location information when the stock options were exercised.

In an embodiment, tax assessment system 130 is configured to parse data provided by MTS 150, and identify tax authorities associated with a mobility taxable event. In response to determining tax authorities, tax assessment system 130 determines tax liability for at least a portion of the identified tax authorities. Thereafter, tax assessment system 130 determines withholding information, in particular, the amount of proceeds to withhold from the recipient to satisfy the tax liability for each tax authority. Tax assessment system 130 provides withholding information to payroll system 170.

In an embodiment, payroll system 170 may be any hardware and/or software suitably configured to distribute proceeds from deferred compensation awards. Payroll system 170 may be configured to: (1) identify proceeds from a deferred compensation award; (2) analyze withholding information from tax assessment system 130; (3) withhold proceeds from deferred compensation awards to satisfy tax liability; (4) distribute proceeds to recipients; and (5) distribute withheld proceeds to tax authorities. Where proceeds are provided in the form of stock, such as, for example, when shares of restricted stock vest, payroll system 170 is configured to initiate a sale of shares to satisfy the tax liability associated with the taxable event.

In an embodiment, payroll system 170 is in electronic communication with report engine 180. Report engine 180 may be any hardware and/or software suitably configured to create electronic or paper records of taxable events. Report engine 180 may be configured to create records indicating that a taxable event has occurred, a tax liability has been satisfied, and/or proceeds were received by a recipient.

Figure 2:
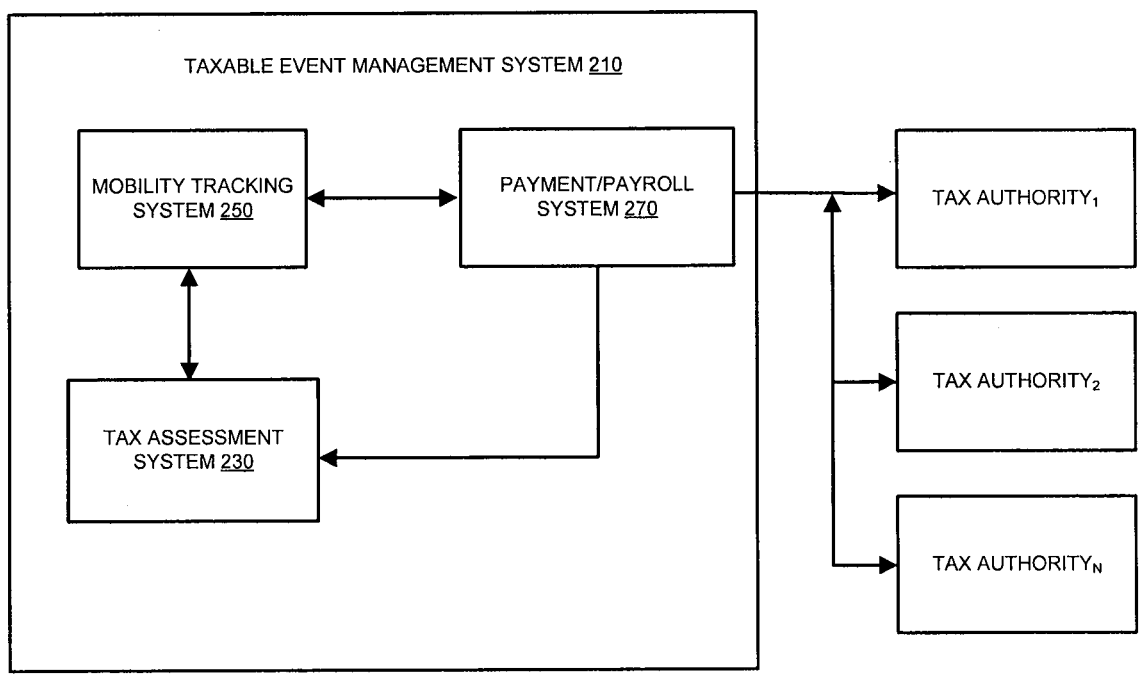
FIG. 2 is a block diagram illustrating major system components for processing tax withholdings and payments to multiple tax authorities, in accordance with an exemplary embodiment of the present invention.

With reference to FIG. 2 and in accordance with an embodiment, tax assessment system 230 may be configured to identify multiple tax authorities (e.g. tax authority$_1$, tax authority$_2$, tax authority$_3$ ... tax authority$_N$). Tax assessment system 230 is configured to provide tax liability information for each tax authority to payroll system 270. Payroll system 270 is configured to withhold proceeds from a deferred compensation award to satisfy each tax liability. Payroll system 270 is further configured to transfer proceeds to the multiple tax authorities, for example, tax authority$_1$, tax authority$_2$, tax authority$_N$.

Figure 3:
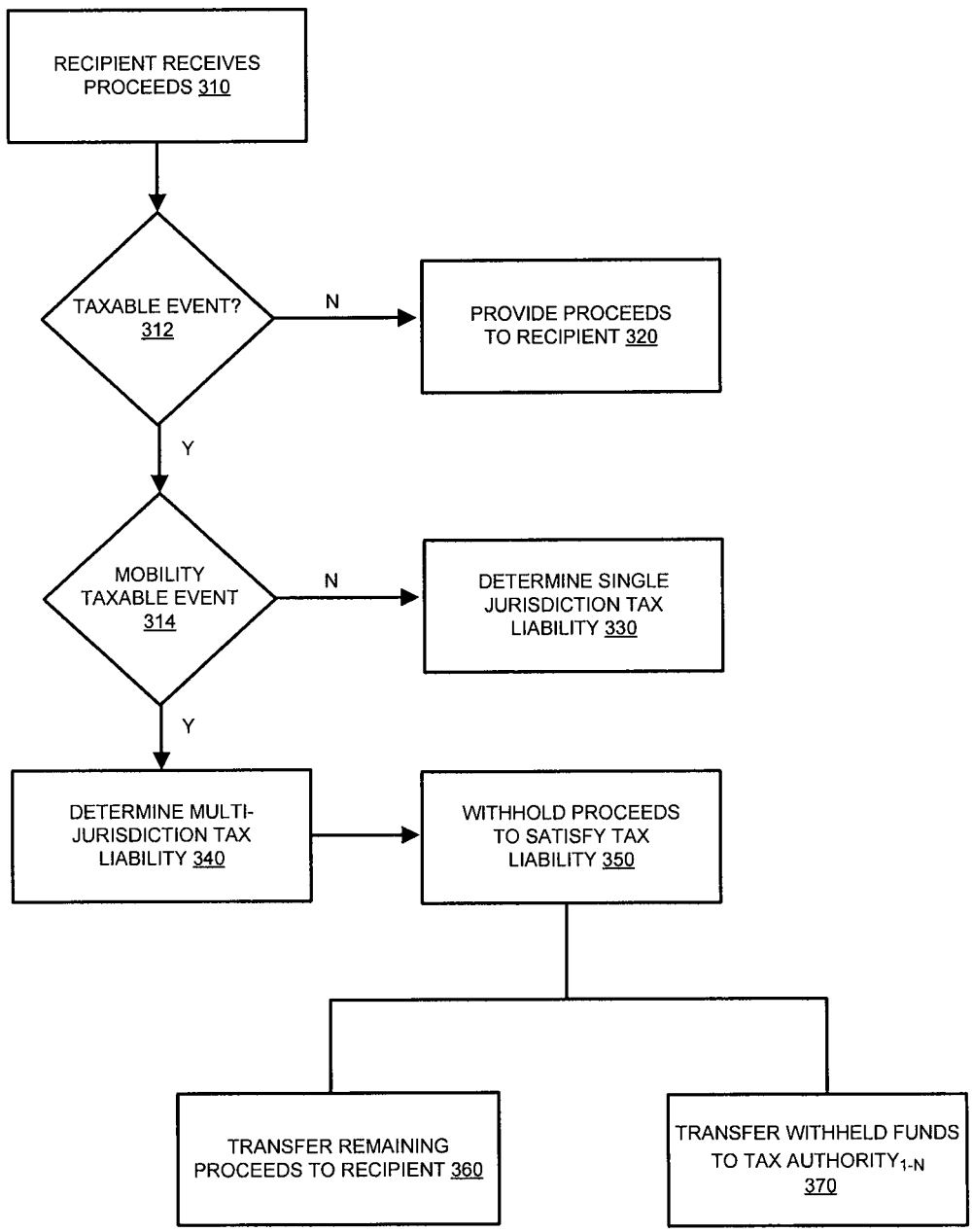
FIG. 3 is a flow chart illustrating an exemplary process for determining tax liabilities in deferred compensation transactions, in accordance with an exemplary embodiment of the present invention.

In summary with respect to an exemplary method, and with reference to FIG. 3, Taxable Event Management Process ("TEMP") 300 is provided. TEMP 300 is initiated where recipient receives proceeds from a deferred compensation award (Step 310). The details of the transactions are identified and analyzed to determine whether a taxable event has occurred (Step 312). If no taxable event has occurred, the proceeds are provided to the recipient (Step 320). Where a taxable event is identified, the transaction and recipient are analyzed to determine whether a mobility taxable event has occurred (Step 314). If no mobility taxable event is identified, TEMP 300 determines single jurisdiction tax liability (Step 330). If a mobility taxable event is identified, TEMP 300 determines multi-jurisdiction tax liability (Step 340). Thereafter, proceeds are withheld to satisfy the single jurisdiction tax liability or multi-jurisdiction tax liability (Step 350). Then TEMP 300 transfers the remaining proceeds to the recipient (Step 360). Finally, TEMP 300 transfers the withheld fund to the tax authority(ies), for example, tax authority$_1$, tax authority$_2$, tax authority$_N$ (Step 370).

The systems and methods discussed herein may also interface with any other taxation system and/or method for acquiring tax data, acquiring location data, facilitating the determination of the taxable authorities, calculating and accounting transaction taxes for events associated with personal communication devices and/or determining a taxable authority and calculating a tax rate for a transaction. The transaction tax settlement system may include a personal communication device configured to participate in a transaction, a tax information system, and a communication network providing two-way communication between the personal communication device and the tax information system. The tax information system may include a tax directory configured to facilitate identification of a tax authority capable of imposing a tax on the transaction, and a tax authority calculation configured to facilitate determination of a tax rate on the transaction. A transactional tax settlement system for use in a buyer/seller transaction over a network may also be interfaced with the embodiments discussed herein. In particular, the system may include a personal communication device configured to initiate a purchase request from a seller via a network, a tax information system, and an electronic invoice representative of the purchase. The tax information system may be configured to receive a request from the seller. The request including transaction data for the tax information system to consider in facilitating identification of a taxing authority capable of imposing a tax on the purchase, and in facilitating calculation of a tax rate corresponding to the taxing authority.

A transactional tax settlement system for use in a telecommunications network may also interface with the embodiments herein. In particular, such a system includes a mobile communication device configured to communicate over a wireless telecommunication network, a telecommunication service provider configured to facilitate a connection to the wireless telecommunication network, a tax information system, and a communication network providing two-way communication between the telecommunication service provider and the tax information system. The tax information system includes a tax directory configured to facilitate identification of a taxing authority capable of imposing a tax on the connection, and a tax authority calculation corresponding to the tax authority and configured to facilitate determination of a tax rate on the connection.

A transactional tax settlement system for a peer-to-peer transaction may also interface with the embodiments herein. In particular, such a system includes first and second personal communication devices configured to participate in a peer-to-peer transaction, a tax information system, and a communication network providing two-way communication between one of said personal communication devices and the tax information system. The tax information system includes a tax directory configured to facilitate identification of a tax authority capable of imposing a tax on the transaction, and a tax authority calculation corresponding to the tax authority and configured to facilitate determination of a tax rate on the transaction.

For example, the system and method may interface with a device or system that performs a method for facilitating transaction tax settlement at a personal communications device. Such a method may comprise receiving a listing of tax rates and a listing of tax calculation rules from a tax information system; grouping a subset of the listing of tax rates and a subset of the listing of tax calculation rules based on whether the listing of tax rates and the listing of tax calculation rules are not subject to modification for a predetermined period of time; storing the subset of the listing of tax rates and the subset of the listing of tax calculation rules to create stored taxation rules; receiving a request for a transaction, wherein the transaction is subject to the stored taxation data; determining a geographical location of the personal communications device using a location apparatus; searching for a tax rate and a tax calculation rule from the taxation data located on the personal communications device based on the request and the geographic location; determining when the tax rate and the tax calculation rule is located, whether an update is required of the a tax rate and the tax calculation rule located on the personal communications device based on a universally coordinated timestamp provided by a location signal of the location apparatus; receiving an update for the tax rate and the tax calculation rule from a tax information system when the update is required; causing the tax information system to retrieve a list of identified tax authorities when the taxation data at the personal communications device does not include the tax rate and the tax calculation rule is applicable to the request, wherein the tax information system includes the listing of tax authorities for facilitating identification of certain of the tax authorities capable of imposing a tax on the transaction based on a type of the transaction, a merchant type, and the geographic location, wherein the tax information system does not calculate a tax amount; receiving the list of the identified tax authorities from the tax information system such that the personal communications device can allow selection of a subset of the a list of the identified tax authorities; sending a request directly to the identified tax authorities, wherein the request includes information relating to the transaction; and, receiving a tax rate and a tax rate calculation rule for the transaction from the identified tax authorities, wherein the tax rate and the tax calculation rule is returned directly to the personal communications device. For more details related to the system and method see, for example, U.S. Ser. No. 10/076,337 filed on Feb. 15, 2002 entitled "Transaction Tax Settlement In Personal Communication Devices," which is hereby incorporated by reference in its entirety.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to any component of TEMS 110, Internet server 108 may invoke an authentication server (not shown) in response to recipient 105 submissions of authentication credentials received at Internet server 108 from web client 107. The authentication server may include any hardware and/or software suitably configured to receive authentication credentials, encrypt and decrypt credentials, authenticate credentials, and grant access rights according to privileges (e.g., pre-defined privileges) attached to the credentials. The authentication server may grant varying degrees of application and data level access to users based on information stored within a database and/or any other known memory structure.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

In addition to those described above, the various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, offline communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards And Protocols (1998); Java 2 Complete, various authors, (Sybex 1999); Deborah Ray And Eric Ray, Mastering Html 4.0 (1997); and Loshin, TCP/IP Clearly Explained (1997) and David Gourley and Brian Totty, HTTP, The Definitive Guide (2002), the contents of which are hereby incorporated by reference.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

We claim:

1. A method comprising:
receiving, by a computer based system for determining tax liability, first information in response to a recipient receiving proceeds of a deferred compensation award;

receiving, by the computer based system, second information of a taxable event in response to the recipient receiving the proceeds from the deferred compensation award;

determining, by the computer based system and in response to the recipient receiving the proceeds from the deferred compensation award, location information of the recipient, wherein the location information comprises first location information of the recipient associated with the granting of a deferred compensation award and second location information associated with the recipient receiving the proceeds;

characterizing, by the computer based system and based on the location information, the proceeds as at least one of a mobility event and a non-mobility event, wherein in response to characterizing the proceeds as the mobility event, determining a first duration of time where the recipient is subject to a first taxing authority associated with the first location and a second duration of time where the recipient is subject to a second taxing authority associated with the second location; and determining, by the computer based system and in response to the recipient receiving the proceeds, a total tax liability of the recipient comprising a first tax liability associated with the first taxing authority and a second tax liability associated with the second taxing authority, wherein the first tax liability is based on the first duration and a first taxing authority tax rate, and wherein the second tax liability is based on the second duration and a second taxing authority tax rate; and communicating, by the computer based system, the total tax liability of the recipient to a payroll system, wherein the payroll system withholds a percentage of the proceeds associated with the taxable event to satisfy the total tax liability.

2. The method of claim 1, wherein the determining the location information of the recipient is conducted in real time.

3. The method of claim 1, wherein the determining the tax liability of the recipient is completed in a mandated period of time.

4. The method of claim 1, further comprising allocating, by the computer based system, the total tax liability to the first taxing authority and the second taxing authority in response to characterizing the proceeds as the mobility event.

5. The method of claim 1, further comprising withholding, by the computer based system, the proceeds of the deferred compensation award to at least partially satisfy the total tax liability to the first taxing authority and the second taxing authority.

6. The method of claim 4, further comprising transferring, by the computer based system, a percentage of the proceeds of the deferred compensation award to the first taxing authority and the second taxing authority.

7. The method of claim 1, wherein the total tax liability is at least one of municipal tax liability, county tax liability, state tax liability, and country tax liability.

8. The method of claim 1, wherein the taxable event is triggered in response to a request of the recipient.

9. The method of claim 1, wherein the taxable event is triggered in response to a vesting of restricted stock.

10. The method of claim 1, further comprising reporting, by the computer based system, of a transfer of the proceeds to the first taxing authority and the second taxing authority, wherein the proceeds satisfy the total tax liability associated with the taxable event.

11. The method of claim 10, wherein the first taxing authority and the second taxing authority are associated with the location information of the recipient.

12. The method of claim 1, further comprising communicating, by the computer based system, the total tax liability of the recipient to a payroll system.

13. The method of claim 1, further comprising communicating, by the computer based system, the total tax liability of the recipient to a payroll system, wherein the payroll system withholds a percentage of the proceeds associated with the taxable event to satisfy the total tax liability.

14. A tangible computer-readable storage medium having computer-executable instructions stored thereon that, if executed by a computer based system for determining tax liability, cause the computer based system to perform operations comprising:

receiving, by the computer based system, first information in response to a recipient receiving proceeds of a deferred compensation award;

receiving, by the computer based system, second information of a taxable event in response to the recipient receiving the proceeds from the deferred compensation award;

determining, by the computer based system and in response to the recipient receiving the proceeds from the deferred compensation award, location information of the recipient, wherein the location information comprises first location information of the recipient associated with the granting of a deferred compensation award and second location information associated with the recipient receiving the proceeds;

characterizing, by the computer based system and based on the location information, the proceeds as at least one of a mobility event and a non-mobility event, wherein in response to characterizing the proceeds as the mobility event, determining a first duration of time where the recipient is subject to a first taxing authority associated with the first location and a second duration of time where the recipient is subject to a second taxing authority associated with the second location;

determining, by the computer based system and in response to the taxable event, a total tax liability of the recipient comprising a first tax liability associated with the first taxing authority and a second tax liability associated with the second taxing authority, wherein the first tax liability is based on the first duration and a first taxing authority tax rate, and wherein the second tax liability is based on the second duration and a second taxing authority tax rate; and communicating, by the computer based system, the total tax liability of the recipient to a payroll system, wherein the payroll system withholds a percentage of the proceeds associated with the taxable event to satisfy the total tax liability.

15. A system comprising:

a network interface communicating with a memory;

the memory communicating with a processor for determining tax liability; and the processor, when executing a computer program, is configured to:

receive, by the processor, first information in response to a recipient receiving proceeds of a deferred compensation award;

receive, by the processor, second information of a taxable event in response to the recipient receiving the proceeds from the deferred compensation award;

determine, by the processor and in response to the recipient receiving the proceeds from the deferred compensation award, location information of the recipient, wherein the location information comprises first location information of the recipient associated with the granting of a deferred compensation award and second location information associated with the recipient receiving the proceeds;

characterize, by the processor and based on the location information, the proceeds as at least one of a mobility event and a non-mobility event, wherein in response to characterizing the proceeds as the mobility event, determining a first duration of time where the recipient is subject to a first taxing authority associated with the first location and a second duration of time where the recipient is subject to a second taxing authority associated with the second location;

determining, by the processor and in response to the taxable event, a total tax liability of the recipient comprising a first tax liability associated with the first taxing authority and a second tax liability associated with the second taxing authority, wherein the first tax liability is based on the first duration and a first taxing authority tax rate, and wherein the second tax liability is based on the second duration and a second taxing authority tax rate; and communicate, by the processor, the total tax liability of the recipient to a payroll system, wherein the payroll system withholds a percentage of the proceeds associated with the taxable event to satisfy the total tax liability.

* * * * *